United States Patent

[11] 3,612,875

[72] Inventor Richard Neil Ord
 Richland, Wash.
[21] Appl. No. 82,380
[22] Filed Oct. 15, 1970
[45] Patented Oct. 12, 1971
[73] Assignee The United States of America as
 represented by the United States Atomic
 Energy Commission

[54] MÖSSBAUER SPECTROMETER
 5 Claims, 1 Drawing Fig.
[52] U.S. Cl. ....................................... 250/83.3 R,
 250/84, 250/108 R
[51] Int. Cl. ....................................... G01t 1/16
[50] Field of Search .......................... 250/83.3 R,
 84, 108 R

[56] References Cited
UNITED STATES PATENTS
3,454,766 7/1969 Roughton ................... 250/84 X
3,506,829 4/1970 Hannan ................... 250/83.3 R Primary Examiner—Archie R. Borchelt
Attorney—Roland A. Anderson ABSTRACT: A Mössbauer spectrometer includes a source shielded by a layer of depleted uranium covered with a layer of graded shielding material. A detector is placed so that it is shielded from the gamma radiation from the source. The sample being examined is inclined at an angle to the beam of gamma rays from the source so that the resonant and nonresonant gamma-ray energy is directed to the detector.

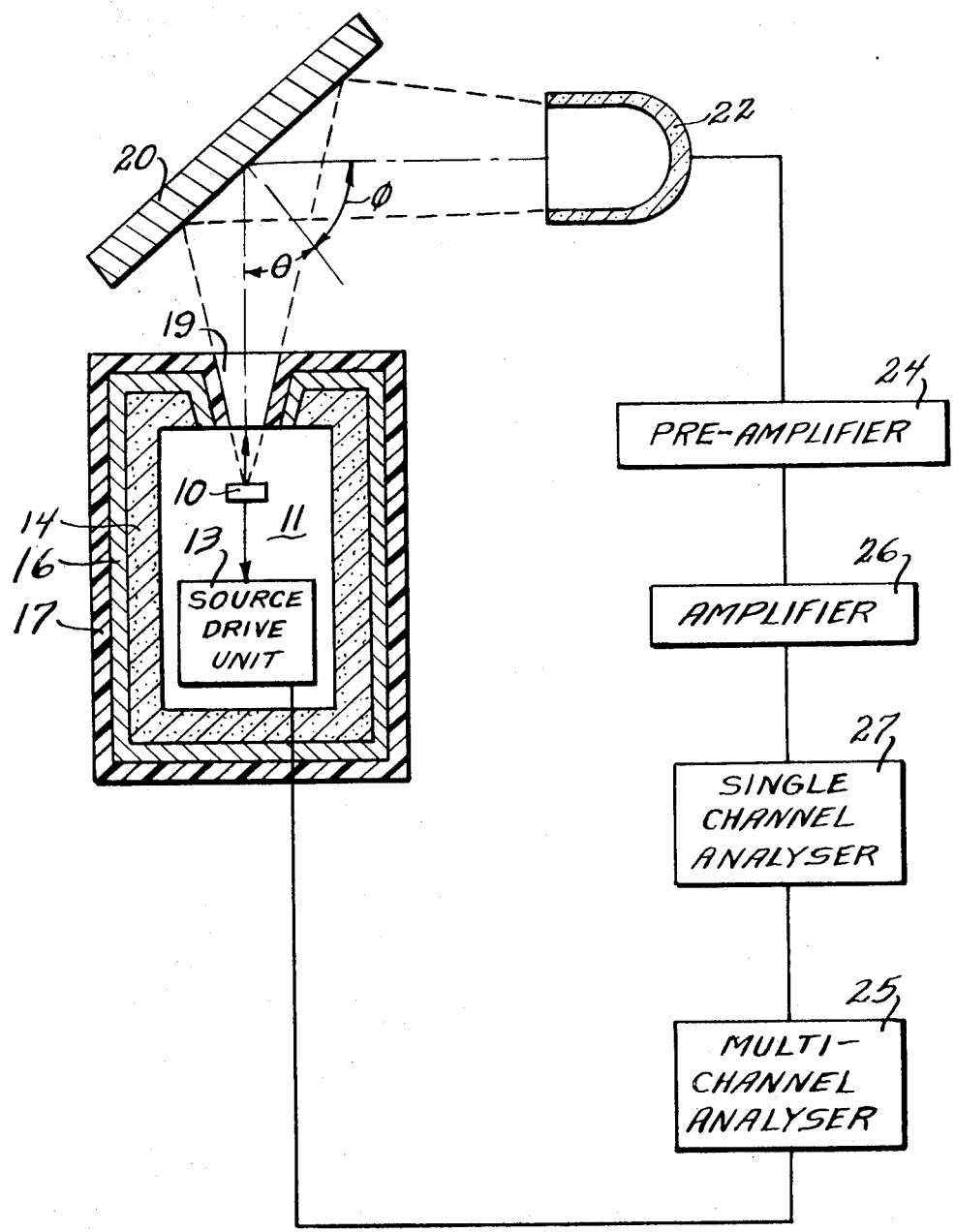

MÖSSBAUER SPECTROMETER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In Mössbauer spectroscopy a radioactive source consisting of excited nuclei decays to the ground state and in so doing emits highly monochromatic gamma radiation. The emitted gamma rays are resonantly absorbed in nuclei within a sample where the nuclei are characteristic of the ground state nuclei of the radioactive source. The resonance line is so narrow that its energy can be shifted significantly by means of the Doppler effect, that is by moving the source (or absorber) at velocities of the order of a few mm./sec.

The conventional technique used in Mössbauer spectroscopy is to locate a thin sample between the radioactive source and an appropriate detector. This technique has the disadvantage that the specimen being examined is radically altered to prepare it for test. The technique is thus not suitable for nondestructive test purposes.

Mössbauer spectrometers have been made which use a reflection or backscatter technique. However, the geometry used has been such that the percentage resonance effect magnitude (R) is low (on the order of 30%). [$R = I(o) - I(\infty)/I(\infty) \cdot 100$] where $I(o)$ is the resonant count and $I(\infty)$ is the nonresonant count. Changes in shielding by the use of heavy metals have only given a slight improvement. The counting time for prior art Mössbauer spectrometers is also very long (many hours) and energy levels of the gamma rays are not easily detected. Increasing the radioactivity of the source to decrease the counting time has an adverse effect on the percentage resonance effect magnitude, thereby decreasing resolution.

It is therefore an object of this invention to provide an improved Mössbauer spectrometer.

Another object of this invention is to provide a Mössbauer spectrometer suitable for nondestructive testing.

Another object of this invention is to provide a Mössbauer spectrometer which has short counting times.

Another object of this invention is to provide a Mössbauer spectrometer which has improved resolution.

SUMMARY OF THE INVENTION

In practicing this invention a Mössbauer spectrometer is provided which includes a high-energy gamma source in a shielded enclosure. The enclosure has a conical collimator as an exit port to provide a collimated beam of gamma rays. The beam of gamma rays is directed against the sample under examination. The surface of the sample is inclined at an angle to the beam of gamma rays so that the resonant and nonresonant gamma-ray energy is directed to a detector positioned out of the path of beam of gamma rays. The detector is placed so that it is completely shielded from the gamma radiation from the source.

The shielding for the enclosure includes a layer of depleted uranium covered with a layer of graded shielding material. The source is moved at a constant acceleration relative to the sample to sweep the sample with a narrow range of gamma-ray energies.

BRIEF DESCRIPTION OF THE DRAWING

The invention is shown in the single drawing, a sectional view of the Mössbauer spectrometer.

DETAILED DESCRIPTION OF THE INVENTION

Referring to the drawing, there is shown a gamma-ray source 10 contained in a shielded enclosure 11. The source 10 is mounted on a drive unit 13. The shielded enclosure 11 includes a shielding layer of depleted uranium 14 and a graded shield consisting of a layer of copper 16 and polyethylene 17. An exit port 19 permits gamma radiation to leave the shielded enclosure 11. The exit port 19 is conical in shape to provide a collimated beam of electrons.

A sample to be examined 20 is positioned opposite exit port 19 and at an angle $\theta$ to the gamma radiation from source 10. Angle $\theta$ may conveniently be 45° but it is not restricted to this angle.

A detector 22 is positioned to receive backscatter Mössbauer gamma radiation from the sample 22 and develops an output signal in response to the gamma radiation detected. Detector 22 is also positioned with shielded enclosure 11 between source 10 and detector 22 so that detector 22 sees only the backscatter gamma radiation from sample 20 and does not see the gamma radiation from source 10. The angle $\Phi$ is chosen to achieve the best possible isolation of detector 22 from source 10 gamma radiation.

The output signal from detector 22 is amplified in preamplifier 24, amplifier 26 and single-channel analyzer 27 and recorder in multichannel analyzer 25. Source drive unit 13 acts to drive source 10 toward and away from sample 20 with a constant acceleration so that the energy of the gamma radiation from source 10 sweeps through a desired energy range. The multichannel analyzer 25 is coupled to drive unit 13 so that the proper channel is selected according to the instantaneous velocity of the source 10.

In an example of a Mössbauer effect spectrometer using the features of the invention, the source 10 was 100 mCi of cobalt-57 deposited on a palladium matrix. The resonance effect magnitude was greater than 200 percent as compared with resonance effect magnitude of the order of 30 percent for prior art Mössbauer spectrometers.

The embodiments of the invention in which an exclusive property or privilege is claimed are defined as follows:

1. A Mössbauer backscatter spectrometer for nondestructive analysis of a material sample, including in combination, a high-energy gamma source, a radiation shield positioned around said gamma source, said radiation shield including a layer of depleted uranium having an exit port therein, means for positioning said sample opposite said exit port in the path of said gamma radiation from said source, said sample being positioned at an angle to said path of said gamma radiation whereby backscattered gamma therefrom is directed away from said path of said gamma radiation, detector means positioned to receive said backscatter gamma from said sample, said detector means further being positioned so that said shielding is between said source and said detector means.

2. The Mössbauer backscatter spectrometer of claim 1 wherein, said radiation shield includes a graded shield surrounding said depleted uranium, said graded shield including a layer of polyethylene and a layer of copper positioned between said polyethylene layer and said depleted uranium.

3. The Mössbauer backscatter spectrometer of claim 2 further including, source driving means positioned within said radiation shield, said source being mounted on said source driving means, said source driving means acting to move said source alternately toward and away from said exit port at a constant acceleration whereby the energy of said gamma radiation is swept across a desired range.

4. The Mössbauer backscatter spectrometer of claim 3 wherein, said exit port is conical in shape.

5. The Mössbauer backscatter spectrometer of claim 4 wherein, said sample is inclined at an angle of 45° to said path of said gamma radiation.